United States Patent
Sano et al.

(10) Patent No.: US 8,069,837 B2
(45) Date of Patent: Dec. 6, 2011

(54) INTAKE CONTROL DEVICE FOR INTERNAL COMBUSTION ENGINE

(75) Inventors: Ryo Sano, Kariya (JP); Masato Ueshima, Muko (JP)

(73) Assignee: Denso Corporation, Kariya (JP)

( * ) Notice: Subject to any disclaimer, the term of this patent is extended or adjusted under 35 U.S.C. 154(b) by 603 days.

(21) Appl. No.: 12/196,577

(22) Filed: Aug. 22, 2008

(65) Prior Publication Data

US 2009/0050098 A1    Feb. 26, 2009

(30) Foreign Application Priority Data

Aug. 24, 2007    (JP) ................... 2007-217822

(51) Int. Cl.
*F02D 9/08*    (2006.01)
*F02D 9/10*    (2006.01)
(52) U.S. Cl. .............. 123/337; 123/336; 251/305
(58) Field of Classification Search .............. 123/337, 123/184.21, 184.61, 336; 251/152, 304, 251/305
See application file for complete search history.

(56) References Cited

U.S. PATENT DOCUMENTS

| | | | |
|---|---|---|---|
| 3,904,172 A * | 9/1975 | Baumann | 251/305 |
| 7,588,008 B2 * | 9/2009 | Ogawa et al. | 123/184.21 |
| 2007/0028891 A1 | 2/2007 | Akagawa | |
| 2007/0051339 A1 * | 3/2007 | Torii et al. | 123/336 |
| 2007/0144483 A1 * | 6/2007 | Torii et al. | 123/337 |
| 2008/0035107 A1 * | 2/2008 | Torii | 123/336 |
| 2009/0314242 A1 * | 12/2009 | Ishihara et al. | 123/184.56 |

* cited by examiner

*Primary Examiner* — Willis Wolfe, Jr.
*Assistant Examiner* — Anthony L Bacon
(74) *Attorney, Agent, or Firm* — Nixon & Vanderhye PC

(57) ABSTRACT

An intake control device for an internal combustion engine includes an intake air induction duct, a housing, a valve, and a gasket. The housing is received in a receiving chamber of the intake air induction duct. The valve is received in the housing for opening and closing an intake passage defined in the housing. The gasket is mounted on one of (a) a position between the intake air induction duct and the attachment surface, and (b) a position between the housing and a wall surface of the receiving chamber. The housing opposes the attachment surface and is spaced from the attachment surface by a predetermined clearance. The gasket has an elastic deformation portion that is positioned between the housing and the attachment surface.

11 Claims, 4 Drawing Sheets

RELATED ART

INTAKE CONTROL DEVICE FOR INTERNAL COMBUSTION ENGINE

CROSS REFERENCE TO RELATED APPLICATION

This application is based on and incorporates herein by reference Japanese Patent Application No. 2007-217822 filed on Aug. 24, 2007.

BACKGROUND OF THE INVENTION

1. Field of the Invention

The present invention relates to an intake control device for an internal combustion engine.

2. Description of Related Art

Conventionally, intake control devices for an internal combustion engine have been known to generate a whirl flow in an axial direction (tumble flow) in a combustion chamber of the internal combustion engine by reducing a cross-sectional area of an intake passage to the internal combustion engine. As a result, an efficiency of combustion in the combustion chamber is enhanced for improving a fuel efficiency (fuel economy). Also, an engine performance such as an engine output and an exhaust gas emission, is improved.

Figure 3A:
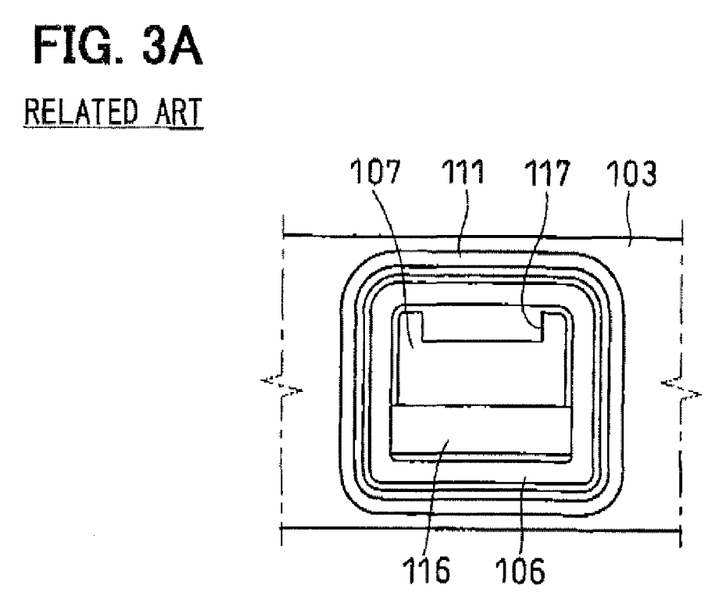
FIG. 3A is a cross-sectional view of a conventional intake control device for an internal combustion engine taken along line IIA-IIA in FIG. 3B.
Figure 3B:
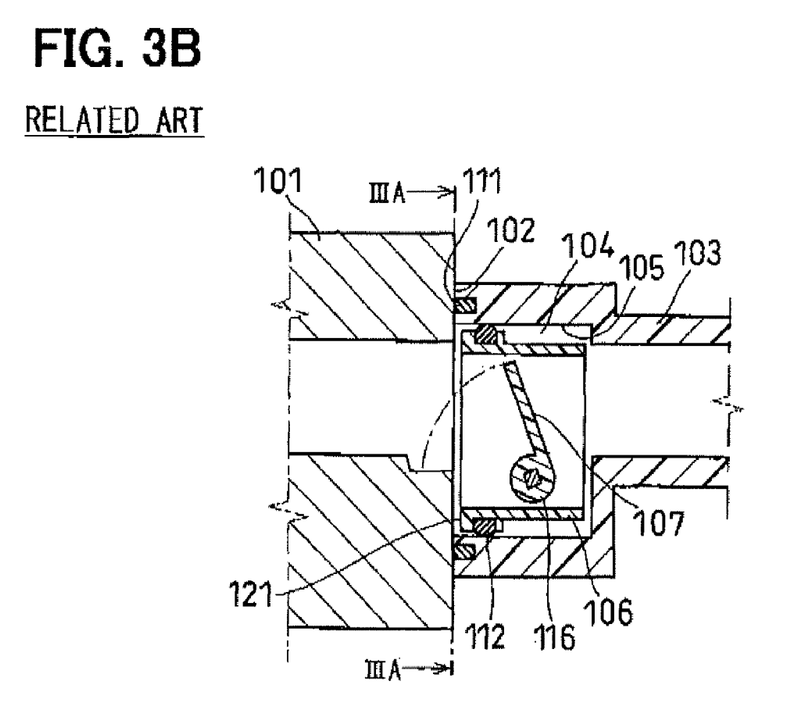
FIG. 3B is a schematic drawing showing the conventional intake control device for the internal combustion engine.
Figure 4:
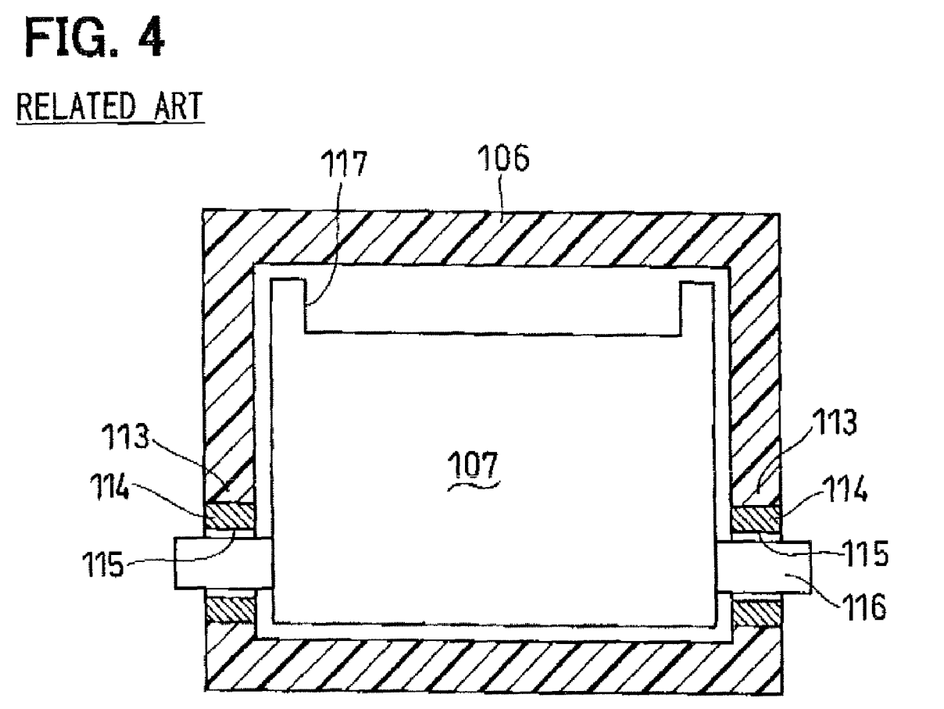
FIG. 4 is a schematic drawing for a conventional valve unit for the conventional intake control device.

The tumble control valve (valve unit), which generates a tumble flow in the combustion chamber of the internal combustion engine, includes a housing 106 and a valve 107 as shown in FIGS. 3A, 3B, and 4. The housing 106 is received in an intake manifold 103, which is connected with an intake manifold attachment surface 102 of a cylinder head 101 of the internal combustion engine. Specifically, the housing 106 is received in a housing receiving chamber 104 of the intake manifold 103. Also, the valve 107 is received in the housing 106 for opening and closing a passage.

There is provided a first gasket 111 between the intake manifold attachment surface 102 of the cylinder head 101 and the intake manifold 103 in order to prevent intake air from leaking to exterior. Also, there is provided a second gasket 112 between a receiving chamber wall surface 105 (internal wall surface) of the intake manifold 103 and the housing 106 in order to elastically support the valve unit in the housing receiving chamber 104.

The housing 106 is provided with two valve bearing portions 113, each of which defines a bearing fitting hole (bearing hole) therein. Two bearings 114 are fitted with hole wall surfaces of the bearing holes in a fixed relation. Also, circular slide holes 115 are defined inside the two bearings 114 for pivotally support both axial end portions (two valve slide portions) of the valve 107 along a rotational axis such that the valve 107 is slidable in a rotating direction.

The valve 107 of the valve unit includes a rotational shaft 116 that is rotatably received in the housing 106 (bearing hole). Also, the valve 107 includes an opening 117 (notch) at a top end portion of the valve 107 along a vertical axis or in a gravitational force direction for generating the tumble flow in a fully-closed state of the valve 107, where the valve 107 is fully closed as shown in FIG. 4.

The first gasket 111 functions to seal or tightly seal an annular clearance defined between the intake manifold attachment surface 102 of the cylinder head 101 and a bonding surface of the intake manifold 103. Also, the second gasket 112 functions to seal or tightly seal another annular clearance defined between an internal wall surface 105 of the intake manifold 103 and the housing 106.

The intake control device for the internal combustion engine, as shown in FIGS. 3A, 3B uses the second gasket 112 to elastically support the valve unit in the housing receiving chamber 104 of the intake manifold 103. In the above, the second gasket 112 is provided between the internal wall surface 105 of the intake manifold 103 and the housing 106 in a direction perpendicular to the intake air flow direction.

In contrast, a necessary clearance that is required to smoothly rotate the valve 107 is defined between (a) a slide surface of each of both axial end portions of the valve 107 along the rotational axis and (b) a hole wall surface of each of the slide holes 115 of the two bearings 114.

Also, the housing 106 includes an annular end surface 121 on a downstream side of the housing 106 in the intake air flow direction, and the annular end surface 121 faces with the intake manifold attachment surface 102 of the cylinder head 101 and is spaced from the intake manifold attachment surface 102 by a predetermined clearance (clearance in the intake air flow direction).

FIGS. 3A, 3B, and 4 show the intake control device for the internal combustion engine, in which there is defined a clearance between the rotational shaft 116 of the valve 107 and each of two bearings 114 in order to avoid limiting a smooth rotation of the valve 107. In the intake control device for the internal combustion engine, when the valve 107 is fully closed or is at a fully closed position, the valve 107 severely receives vacuum pressure of intake air in the internal combustion engine, and thereby the valve 107 may be displaced toward the downstream side in the intake air flow direction by an amount equivalent to the clearance.

Specifically, if the valve unit is displaced toward the downstream side in the intake air flow direction when the valve 107 is fully closed, the annular end surface 121 of the housing 106 severely collides with the intake manifold attachment surface 102 of the cylinder head 101 and thereby causing a large collision noise (hitting noise). As a result, the noise may provide an unpleasant abnormal noise to a driver.

In order to deal with the above, there is known an intake control device for the internal combustion engine, in which an upstream side end surface of the housing is pressed by an elastic member, and in which a downstream side end surface of the housing is pressed by a projection portion that projects from a receiving chamber wall surface of the intake manifold toward the intake passage. Thus, the unwanted movement of the valve unit in the receiving chamber of the intake manifold or the displacement of the valve unit in the intake air flow direction is limited (for example, JP-A-2007-046470 corresponding to US20070028891).

However, in the above conventional intake control device for the internal combustion engine described in JP-A-2007-046470, the elastic member for pressing the upstream side end surface of the housing is separately provided as a separate component in addition to first and second gaskets 11, 112. As a result, the number of components and assembly manpower is increased, and thereby causing an increase in cost disadvantageously.

SUMMARY OF THE INVENTION

The present invention is made in view of the above disadvantages. Thus, it is an objective of the present invention to address at least one of the above disadvantages.

To achieve the objective of the present invention, there is provided an intake control device for an internal combustion engine, which device includes an intake air induction duct, a housing, a valve, and a gasket. The intake air induction duct is bonded to an attachment surface of the internal combustion engine, and the intake air induction duct defines a receiving chamber therein. The housing is received in the receiving chamber of the intake air induction duct, and the housing defines an intake passage therein. The valve is received in the housing for opening and closing the intake passage. The gasket is mounted on one of (a) a position between the intake air induction duct and the attachment surface of the internal combustion engine, and (b) a position between the housing and a wall surface of the receiving chamber of the intake air induction duct. The housing opposes the attachment surface of the internal combustion engine and is spaced from the attachment surface by a predetermined clearance. The gasket has an elastic deformation portion that is positioned between the housing and the attachment surface of the internal combustion engine.

BRIEF DESCRIPTION OF THE DRAWINGS

The invention, together with additional objectives, features and advantages thereof will be best understood from the following description, the appended claims and the accompanying drawings in which:

DETAILED DESCRIPTION OF PREFERRED EMBODIMENTS

First Embodiment

Configuration of First Embodiment

Figure 1A:
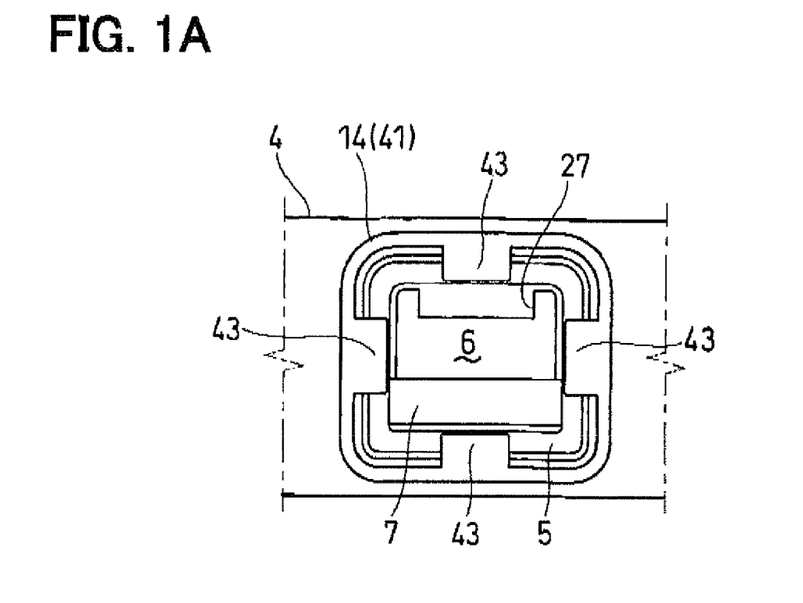
FIG. 1A is a cross-sectional view of an intake control device for an internal combustion engine taken along line IA-IA in FIG. 1B according to a first embodiment of the present invention.
Figure 1B:
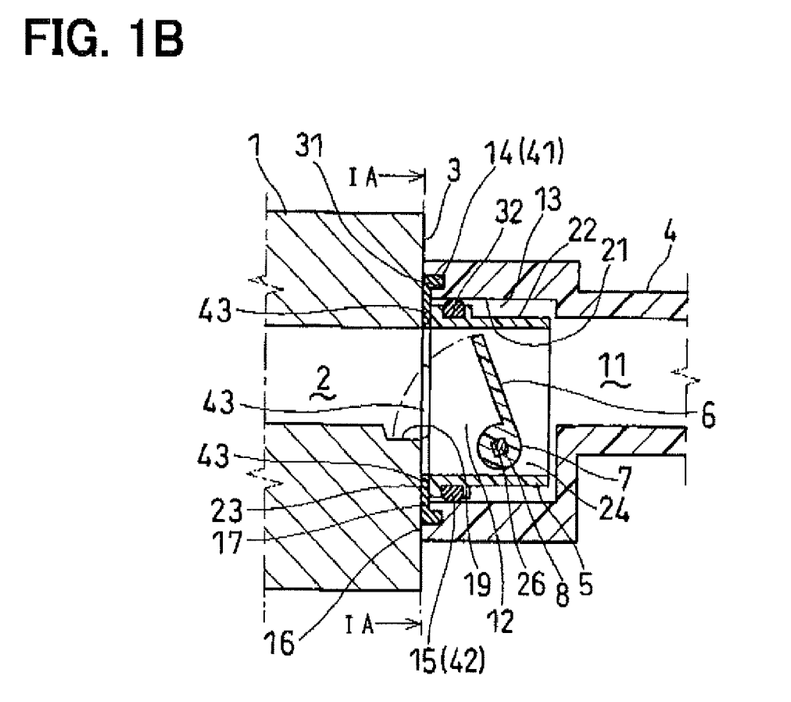
FIG. 1B is a schematic drawing showing the intake control device for the internal combustion engine.

FIG. 1A is a diagram illustrating a valve unit (cartridge) according to a first embodiment of the present invention, and FIG. 1B is a drawing illustrating an intake control device for an internal combustion engine.

The intake control device for the internal combustion engine of the present embodiment includes an intake passage opening/closing device (throttle control device) and an intake air vortex flow generator (intake air module). The intake passage opening/closing device opens and closes an intake air induction passage (intake passage to the internal combustion engine), which supplies suctioned air (intake air) to a combustion chamber for each cylinder of the internal combustion engine (for example, four-cylinder gasoline engine referred as an engine). The intake air vortex flow generator generates an intake air vortex flow in order to facilitate combustion of air-fuel mixture in each cylinder of the engine.

In the above configuration, the engine generates an output caused by thermal energy obtained by causing the combustion of the air-fuel mixture, which includes intake air and fuel, in the combustion chamber. The engine employs a four-cycle engine, in which four strokes, such as an intake stroke, a compression stroke, an expansion (combustion) stroke, and an exhaust stroke, are cyclically repeated. For example, the engine is mounted in an engine room of a vehicle, such as an automobile. The engine includes an intake pipe (intake duct) and an exhaust pipe (exhaust duct). The intake pipe introduces intake air to the combustion chamber of the engine, and the exhaust pipe discharges exhaust gas in the combustion chamber of the engine to an exterior via an exhaust gas purifying device.

The engine includes a cylinder block (not shown) and a cylinder head 1 The cylinder block defines a cylinder bore therein, and the cylinder head 1 is mounted on a head attachment surface of the cylinder block via a metal gasket.

A piston is received in the cylinder bore of the cylinder block for being slidable in a center axial direction of the cylinder bore. The piston is connected with a crank shaft via a connecting rod.

The cylinder head 1 has intake ports 2 on one end of the cylinder head 1, and each of the intake ports 2 is opened and closed by a poppet intake valve. Also, the cylinder head 1 has exhaust ports on the other end of the cylinder head 1, and each exhaust port is opened and closed by a poppet exhaust valve.

The cylinder head 1 is provided with spark plugs (not shown) such that each of the spark plugs has an end portion exposed to the combustion chamber of each cylinder. Also, the cylinder head 1 is provided with an injector (an internal combustion engine fuel injection valve, an electromagnetic fuel injection valve, which are not shown), and the injector injects fuel in the intake port 2 of each cylinder of the engine at optimal timing.

Also, the cylinder head 1 has a releasing groove 19 on an upstream side of the cylinder head 1 in the intake air flow direction toward the intake manifold. In other words, the intake port 2 is provided with the releasing groove 19 at the upstream side of the intake port 2, for example. The releasing groove 19 is recessed by a dimension generally equivalent to the thickness of an intake air flow control valve 6, which will be described later, of the valve unit such that the releasing groove 19 projects downwardly in FIG. 1B.

Also, the cylinder head 1 is integrally provided with multiple bonding portions on the upstream side of an end portion of the cylinder head 1 in the intake air flow direction toward the intake manifold, and each of the bonding portions has an intake manifold attachment surface 3 (an attachment surface of the internal combustion engine). The multiple intake ports 2 defined in the cylinder head 1 open at the intake manifold attachment surfaces 3 of the cylinder head 1. Also, each bonding portion of the cylinder head 1 is integral with a flange portion that has multiple bolt holes, through which fastening bolts extend.

The intake pipe of the engine serves as a casing for supplying intake air into the combustion chamber of each cylinder of the engine, and the intake pipe includes an air cleaner case, a throttle body, a surge tank, and an intake manifold 4 (intake air induction duct). The air cleaner case receives and supports an air cleaner (filtration element) that filters intake air. The throttle body is located downstream of the air cleaner case in the direction of the intake air flow (intake air flow direction) and is connected with the air cleaner case. The surge tank is located downstream of the throttle body in the intake air flow direction and is connected with the throttle body. The intake manifold 4 (intake air induction duct) has a double tube structure, and is located downstream of the surge tank in the intake air flow direction to be connected with the surge tank.

In the above, the throttle control device of the present embodiment controls a flow of intake air supplied to the combustion chamber of each cylinder of the engine in accordance with a throttle opening degree, which corresponds to a valve opening degree of the throttle valve.

The throttle control device includes the throttle body, a butterfly throttle valve, and a return spring. The throttle body is provided in the intake pipe of the engine, and the butterfly throttle valve changes an amount of intake air that flows inside the intake pipe (intake passage). The return spring or a default spring biases the throttle valve in a valve closing direction or in a valve opening direction.

Also, the throttle body includes an actuator having an electric motor that drives a rotational shaft, which supports the throttle valve in a fixed relation, in the valve opening direction or in the valve closing direction. As above, the throttle valve rotates about the rotational shaft.

In the above configuration, the electric motor that drives the throttle valve is energized and controlled by an engine control unit (engine control device referred as an ECU).

Similar to the engine, the intake air vortex flow generator of the present embodiment is mounted in the engine room of the vehicle, such as the automobile. The intake air vortex flow generator generates an intake air vortex flow in the axial direction (tumble flow) in order to facilitate or enhance the combustion of the air-fuel mixture in the combustion chamber of each cylinder of the engine.

The intake air vortex flow generator is assembled into an intake system of the engine together with the throttle control device. Also, the intake air vortex flow generator is a multiple integral intake passage opening/closing device (valve opening and closing device), in which multiple valve units or multiple tumble flow control valves (TCVs) are assembled as a one-piece construction in the intake manifold 4. Specifically, the multiple valve units are parallelly spaced from each other in the axial direction of a pin rod 8 (shaft) or along the rotational axis of the pin rod 8 by predetermined intervals in the intake manifold 4 (housing receiving chambers 13).

The intake air vortex flow generator includes the intake manifold 4, the multiple valve units, an actuator, and an ECU. The intake manifold 4 is bonded with the intake manifold attachment surface 3 of the cylinder head 1 of the engine. Each of the multiple valve units (TCVs) generates the tumble flow in the combustion chamber by controlling intake air in the intake manifold 4 or intake air that flows through first and second intake passages 11, 12, which communicate with the intake port 2 of the engine. The actuator includes an electric motor that drives the pin rod 8, which is press fitted with a rotational shaft 7 of the intake air flow control valve 6. In the above, the intake air flow control valve 6 serves as a valve element of the TCV. The ECU controls the valve opening degree of the TCV in association with each system of the throttle control device.

Each valve unit (TCV) of the present embodiment includes a housing 5 and the intake air flow control valve 6. The housing 5 is received in the housing receiving chamber 13 of the intake manifold 4, and the intake air flow control valve 6 is received in the housing 5 or in the second intake passage 12 of the housing 5 for opening and closing the second intake passage 12.

There is provided a first gasket 14 between (a) the intake manifold attachment surface 3 of the cylinder head 1 and (b) the intake manifold 4 such that the first gasket 14 limits intake air from leaking to exterior. Also, there is provided a second gasket 15 between the housing 5 and a wall surface of the receiving chamber 13 of the intake manifold 4 such that the second gasket 15 elastically supports the valve unit in the housing receiving chamber 13 of the intake manifold 4.

It should be noted that the housing 5 and the intake air flow control valve 6 constitutes a valve unit (cartridge) that is fitted inside each housing receiving chamber 13 of the intake manifold 4.

The intake manifold 4 of the present embodiment is integrally molded of a resin material to have a predetermined shape, and is air-tightly connected at a position downstream of the throttle body of the intake pipe of the engine in the intake air flow direction. The intake manifold 4 has multiple polygonal tubular portions, each of which is configured to surround each valve unit, or more specifically, to surround a periphery of each housing 5. Each of the polygonal tubular portions constitutes an outer polygonal tubular portion of the intake manifold 4 having the double tube structure.

There are provided first intake passages 11 (intake air induction passage) inside the intake manifold 4. Each first intake passage 11 has a cross section of a square shape or of a rectangular shape. Each first intake passage 11 is independently connected with the intake port 2 of each cylinder of the engine via a corresponding second intake passage 12.

The intake manifold 4 includes the housing receiving chamber 13 at a position downstream of the first intake passage 11 in the intake air flow direction, and the housing receiving chamber 13 has a cross section of a square shape or of a rectangular shape. Each housing receiving chamber 13 serves as a valve unit receiving portion (valve unit receiving space), which receives a corresponding one of the multiple valve units (cartridge). Also, the housing receiving chamber 13 has a cross-sectional area of the opening, which area is greater than a cross-sectional area of the first intake passage 11.

The intake manifold 4 is integrally provided with a bonding portion that includes multiple bonding surfaces 16 on a downstream end portion of the intake manifold 4 in the intake air flow direction toward the cylinder head 1. The bonding portion is air-tightly bonded with the intake manifold attachment surface 3 of the cylinder head 1.

The multiple housing receiving chambers 13 defined inside the intake manifold 4 open at the bonding surfaces 16 of the intake manifold 4, respectively. Also, the bonding portion of the intake manifold 4 is integrally provided with a flange portion having multiple screw holes, into which fastening bolts are screwed.

Also, there is provided an annular end surface 17 at the bonding portion of the intake manifold 4, or more specifically, the annular end surface 17 is provided at an a radially inward portion of the intake manifold 4 relative to a first gasket fitting groove 31 (described later). The annular end surface 17 opposes the intake manifold attachment surface 3 of the cylinder head 1 and is spaced from the attachment surface 3 by a predetermined clearance.

The intake manifold 4 is fastened to and is bonded with the intake manifold attachment surface 3 of the cylinder head 1 by using multiple fastening bolts in a condition, where the bonding surface 16 of the intake manifold 4 tightly contact the intake manifold attachment surface 3 of the cylinder head 1.

The housing 5 of each of the multiple valve units is integrally molded of a resin material to have a predetermined shape. The multiple housings 5 is elastically supported inside the corresponding housing receiving chambers 13 of the intake manifold 4 via the second gaskets 15.

Each of the multiple housings 5 is a polygonal tube having a polygonal tubular shape for receiving the intake air flow control valve 6 therein such that the intake air flow control valve 6 is selectively operated at an opening position and at a closing position. Also, each housing 5 constitutes an inner polygonal tubular portion of the double tube structure of the intake manifold 4. The housings 5 defines second intake passages 12 (intake passage of the internal combustion engine) therein, and each of the second intake passages 12 has a cross section of a square shape or of a rectangular shape.

Each of the multiple housings 5 includes a pair of opposing wall portions at both ends of each second intake passage 12 in a direction orthogonal to the axial direction (intake air flow direction) of the second intake passage 12. In the above, the above orthogonal direction may be defined as a horizontal direction that is perpendicular to a gravitational force direction of the second intake passage 12. Also, the opposing wall portions may be both side wall portions or left-right side wall portions, and are referred as housing left-right wall portions. Also, each of the multiple housings 5 includes a pair of up-down wall portions at both ends of each second intake passage 12 in another direction orthogonal to the axial direction (intake air flow direction) of the second intake passage 12. In the above, the other orthogonal direction corresponds to the gravitational force direction of the second intake passage 12. The up-down wall portions include a top wall portion and a bottom wall portion, and are referred as housing up-down wall portions.

The second intake passage 12 of each of the multiple housings 5 opens at an upstream end of the housing 5 in the axial direction (intake air flow direction), and the upstream end of the housing 5 serves as an intake air introduction port (inlet portion) for inducting intake air into the second intake passage 12 from the corresponding one of the first intake passages 11 of the intake manifold 4.

Also, the second intake passage 12 of each of the multiple housings 5 opens at a downstream end of the housing 5 in the axial direction (intake air flow direction), and the downstream end of the housing 5 serves as an intake air delivering port (outlet portion) for delivering intake air into the intake port 2 from the corresponding second intake passage 12.

Each of the multiple housings 5 has an outer peripheral surface 22, which faces a receiving chamber wall surface 21 (internal wall surface) of the housing receiving chamber 13 of the intake manifold 4, and which is spaced from the receiving chamber wall surface 21 by a predetermined clearance. Also, each of the multiple housings 5 has an annular end surface 23 at a downstream side of the housing 5 in the intake air flow direction. The annular end surface 23 faces the intake manifold attachment surface 3 of the cylinder head 1 and is spaced from the attachment surface 3 by a predetermined clearance.

Each of the multiple housings 5 includes a valve accommodation space 24 at a lower side of the respective second intake passage 12 in the gravitational force direction. In other words, each housing 5 includes the valve accommodation space 24 at an under surface of the second intake passage 12 in the gravitational force direction or at a bottom surface of the second intake passage 12. The above valve accommodation space 24 is configured to accommodate or receive the intake air flow control valve 6 during the valve fully-opening state such that the intake air flow control valve 6 is limited from projecting in a main passage of the second intake passage 12.

In the above, the main passage of the second intake passage 12 is defined between (a) a valve surface of the intake air flow control valve 6 and (b) the housing upper wall portion of the housing 5 during the valve fully-opening state. Note that the valve surface of the intake air flow control valve 6 corresponds to a flat surface among the two opposite surfaces of the control valve 6. The main passage of the second intake passage 12 is, in other words, a space defined in the second intake passage 12 above the valve accommodation space 24 in the gravitational force direction, and the main passage has the same opening area, which is the same with the area of the first intake passage 11 of the intake manifold 4 and with the area of the intake port 2 of the cylinder head 1.

There are provided two valve bearing portions to oppose with each other at both side wall portions of the housing 5, in other words, at the housing left-right wall portions on both side of the valve accommodation space 24. The valve bearing portions are separated from each other by the second intake passage 12. The valve bearing portions define two supporting holes therein, respectively. Note that, two bearing members (for example, a hollow cylindrical bearing) are fitted and supported in the inner periphery of the above supporting holes. In other words, the valve bearing portions of the housing 5 slidably support both end portions (two valve slide portions) of the intake air flow control valve 6 along the rotational axis of the intake air flow control valve 6 via the two bearings such that the end portions is rotatable in a rotating direction.

In the above structure, each of the two bearings is a hollow cylinder defining the slide hole therein, and is press fitted with a hole wall surface of the corresponding supporting hole of each of the two valve bearing portions of the housing 5. It should be noted that the above bearings may be omitted as required.

The intake air flow control valve 6 of each of the multiple valve units is integrally molded of a resin material to have a predetermined shape. Also, each of the multiple intake air flow control valves 6 has a rotational center axis that is orthogonal to the axial direction (intake air flow direction) of the housing 5, and the control valve 6 rotates about the rotational center axis. The multiple intake air flow control valves 6 are bonded with each other by the single pin rod 8 in a state, where the pin rod 8 extends through the multiple control valves 6. Also, each of the multiple intake air flow control valves 6 is received in the corresponding housing 5 for being able to open and close the second intake passage 12 such that the passage cross-sectional area of the second intake passage 12 is changed. The multiple intake air flow control valves 6 open and close the second intake passages 12 to control intake air flowing through the second intake passages 12.

Each of the multiple intake air flow control valves 6 includes a rotational shaft 7 and a valve main body. The rotational shaft 7 is configured to surround a shaft through hole 26, and to surround each valve supporting portion of the pin rod 8 in a circumferential direction. In other words, the rotational shaft 7 defines the shaft through hole 26 therein. The valve main body has a square plate shape or a rectangular plate shape and extends from the rotation center axis of the rotational shaft 7 toward one side in a radial direction that is perpendicular to the rotational axis.

Also, the rotational shaft 7 of the intake air flow control valve 6 includes the shaft through hole 26, through which the pin rod 8 extends along the rotational axis or in the center axial direction. Note that, the shaft through hole 26 of each intake air flow control valve 6 is configured to have a polygonal hole shape or a rectangular hole shape that corresponds to a cross-sectional shape (a rectangular shape) of the pin rod 8. In other words, the shaft through hole 26 is formed to have a similar hole shape that corresponds to a cross-sectional shape of the valve supporting portion of the pin rod 8. As a result, relative rotation between the rotational shaft 7 of the intake air flow control valve 6 and the pin rod 8 is controlled.

In each of the multiple intake air flow control valves 6, in a fully-closed state, where the plate valve main body is fully closed, the rotational shaft 7 is positioned toward one side of the center section of the valve main body in the valve surface direction that is perpendicular to the thickness direction of the intake air flow control valve 5. In other words, the rotational shaft 7 is positioned closer to the lower side of the second intake passage 12 in the gravitational force direction in a valve fully-closing state, where the opening degree (valve opening degree) of the valve main body corresponds to the fully closed opening degree such that the valve main body is located at the full closed position to fully close the passage. In other words, in the valve unit of the present embodiment, the intake air flow control valve 6 employs a cantilever valve, in which the rotational shaft 7 serving as the rotation center of the valve main body is positioned toward one side of the valve main body relative to the valve center section of the valve main body in the valve surface direction that is perpendicular to the thickness direction of the intake air flow control valve 6. Thus, in the above cantilever valve configuration, the rotational shaft 7 is positioned at the lower side of the valve main body in FIG. 1B, for example.

Also, the rotational shaft 7 of each of the multiple intake air flow control valves 6, is rotatably received in the corresponding housing 5, or more specifically, in the supporting holes of the two valve bearing portion. Also, the rotational shaft 7 is configured to have a hollow cylindrical shape to surround the pin rod 8 in the peripheral direction. The two valve slide portions are provided at both the end portions of the intake air flow control valve 6 along the rotational axis (at both axial end portions of the rotational shaft 7) such that two valve slide portions are supported slidably in the rotating direction via the two bearings at the inner periphery of the two valve bearing portions of the housing 5 (at each hole wall surface of the corresponding supporting hole).

In the multiple valve units, each of the intake air flow control valves 6 is cut at one section (center section) of the valve top end surface, the top end surface being positioned in the top of the valve 6 in the gravitational force direction in the valve fully-closed state, where all of the intake air flow control valves 6 are positioned to fully close the passages. Thus, each intake air flow control valve 6 has a rectangular opening 27 (notch, slit) for generating a drift flow, which is to be a tumble flow in the combustion chamber, to intake air supplied to the combustion chamber of each cylinder of the engine. Note that, the opening 27 may be alternatively omitted. Also, secondary openings (notches) may be additionally formed by cutting one section on each of the valve left-right sides of the intake air flow control valve 6, and the secondary opening may have a smaller opening area smaller than the opening 27, which serves as a primary opening.

In the above configuration, the pin rod 8 of the present embodiment is made of, for example, iron metal material, and is a polygonal-cross-sectional shaft (rectangular steel shaft) having a cross section of a polygonal shape (for example, square shape), which cross section is perpendicular to the rotational axis. The pin rod 8 is received in the corresponding shaft through hole 26 formed in each of the multiple intake air flow control valves 6. The pin rod 8 bonds the rotational shafts 7 of the multiple intake air flow control valves 6 in a state, where the pin rod 8 extends through the rotational shafts 7 in a fixed relation. As a result, the pin rod 8 serves as the single drive shaft that bonds all of the intake air flow control valves 6 such that the intake air flow control valves 6 work together or are operable together. The pin rod 8 is press fitted with the hole wall surface of each shaft through hole 26 formed in each of the multiple intake air flow control valves 6.

Also, in a case, where the pin rod 8 having the polygonal cross section is directly supported by the supporting holes of the two valve bearing portions of the housing 52 the pin rod 8 may not be smoothly rotated. Thus, the pin rod 8 of the present embodiment is covered by the corresponding rotational shaft 7 such that the outer periphery of the pin rod 8 is pivotally supported by the inner peripheral surface (the hole wall surface of the slide hole) of the two bearings via the rotational shaft 7.

Note that, the valve unit of the present embodiment a predetermined slide clearance (clearance) is formed between (a) each of the two valve slide portions of the rotational shaft 7 of the intake air flow control valve 6 and (b) the hole wall surface of each slide hole of the two bearings such that the rotational shaft 7 of the intake air flow control valve 6 is made smoothly rotate in the slide holes of the two bearings.

Each of the first and second gaskets 14, 15 is a rubber elastic body having a oblong annular shape or a rectangular annular shape, which is formed by two pairs of opposing sides. The rubber elastic body is made of an oil resistant rubber, which is resistant to oils and greases, and may be made of, for example, a chloroprene rubber (CR), a nitrite rubber (NBR), or a fluorosilicone rubber.

The first gasket 14 includes a first gasket main body 41 that is provided between the intake manifold attachment surface 3 of the cylinder head 1 and the bonding surface 16 of the intake manifold 4, and the first gasket main body 41 has a square-annular shape or a rectangular-annular shape. The first gasket main body 41 is fitted inside the first gasket fitting groove 31, which is formed at the bonding surface 16 of the intake manifold 4, and which has a square annular shape or a rectangular annular shape. The first gasket main body 41 is provided between the intake manifold attachment surface 3 of the cylinder head 1 and the bonding surface 16 of the intake manifold 4 such that the first gasket main body 41 seals or tightly closes the annular clearance formed between the intake manifold attachment surface 3 of the cylinder head 1 and the bonding surface 16 of the intake manifold 4.

Multiple elastic deformation portions 43 inwardly project from the inner periphery of the first gasket main body 41 to be inserted between the intake manifold attachment surface 3 of the cylinder head 1 and the annular end surface 23 of the housing 5. The multiple elastic deformation portions 43 are positioned between the intake manifold attachment surface 3 of the cylinder head 1 and the annular end surface 23 of the housing 5, and each of the elastic deformation portions 43 serves as an impact force absorbing portion that is elastically deformable in the intake air flow direction. Note that, the multiple elastic deformation portions 43 are respectively provided at four sides of the first gasket main body 41 in the present embodiment. However, the elastic deformation portions 43 may be provided only one pair of opposing sides, alternatively.

Also, each of the elastic deformation portions 43 of the first gasket 14 is set back relative to the intake passage wall surface of the housing 5 in a direction away from the second intake passage such that the elastic deformation portions 43 is limited form projecting in the corresponding second intake passage 12.

In the above, the annular end surface 17 of the intake manifold 4 of the present embodiment is set back relative to the bonding surface 16 of the intake manifold 4 toward the upstream side in the intake air flow direction by a dimension generally equivalent to the thickness of the elastic deformation portion 43 of the first gasket 14. Also, the annular end surface 23 of the housing 5 of the present embodiment is set back relative to the bonding surface 16 of the intake manifold 4 toward the upstream side in the intake air flow direction by the dimension equivalent to the thickness of the elastic deformation portion 43 of the first gasket 14.

The second gasket 15 includes a second gasket main body 42 provided between (a) the internal wall surface 21 of the intake manifold 4 and (b) the outer peripheral surface 22 of the housing 5, and the second gasket main body 42 has a square annular shape or a rectangular annular shape. The second gasket main body 42 is fitted in a second gasket fitting groove 32, which is formed at the outer peripheral surface 22 of the housing 5, and which has a square annular shape or a rectangular annular shape. The second gasket main body 42 is provided between (a) the internal wall surface 21 of the intake manifold 4 and (b) the outer peripheral surface 22 of the housing 5 to seal or tightly close a tubular clearance formed between (a) the internal wall surface 21 of the intake manifold 4 and (b) the outer peripheral surface 22 of the housing 5. Also, the second gasket main body 42 reduces an engine vibration and a vehicle vibration transferred from the intake manifold 4 to the housing 5.

In the above, the ECU is configured to electrically control the electric motor, which drives the intake air flow control valves 6 via the pin rod 8. The ECU includes a known microcomputer, which includes a CPU, a storage apparatus, an input circuit (input portion), an output circuit (output portion), a power source circuit, and a timer. The CPU executes control processes and calculation processes, and the storage apparatus or a memory, such as ROM, RAM, stores control programs, control logics, or various data sets.

Also, when an ignition switch is activated or turned on (IG-ON), the ECU is configured to energize and control the electric motor for the intake air vortex flow generator and the electric motor for the throttle control device based on the control programs or the control logics stored in the memory. Also, in the above case, the ECU drives an ignition device (for example, an ignition coil, a spark plug) and a fuel injection system (for example, an electric fuel pump, an injector). Thus, valve opening degree of the valve unit (TCV), the intake air amount, and the fuel injection quantity are controlled to match the corresponding control command values (control target values) during the operation of the engine.

Also, when the ignition switch is deenergized or turned off (IG-OFF), the ECU is configured to forcibly stop engine control including the ignition control and the fuel injection control, which control are executed based on the control programs or the control logics stored in the memory. Note that, when the engine is stopped or after the engine has been stopped, supply of the electric power to the electric motor for the intake air vortex flow generator is stopped, and thereby the valve unit (TCV) is controlled to fully open the passage, or the valve opening degree of the valve unit (TCV) becomes the fully-opened opening degree by the bias force of the return spring.

Operation of First Embodiment

The operation of the intake control device for the internal combustion engine (the intake air vortex flow generator) of the present embodiment will be described with reference to FIGS. 1A and 1B.

When the ignition switch is activated (IG-ON), the ECU energizes and controls the electric motor for the throttle control device, and the ECU drives the ignition device (for example, the ignition coil, the spark plug), and the fuel injection system (for example, the electric fuel pump, the injector). Thus, the engine is operated. In the above, when the operation of a specific cylinder of the engine is shifted from an exhaust stroke to an intake stroke, a vacuum pressure in the combustion chamber of the cylinder of the interest, which pressure is lower than the atmospheric pressure, is increased in accordance with the descend of the piston, and the air-fuel mixture is auctioned to the combustion chamber through the intake port 2, which is opened. As above, in the intake stroke, the intake valve opens the intake port 2 and the piston descends.

Also, when the engine is heated and thereby the more amount of auctioned intake air (more intake air amount) is required, in other words, when the engine is normally operated, the ECU controls the supply of the electric power to the electric motor, or the ECU energizes the electric motor, for example. In the above, by using the driving force of the electric motor, the multiple intake air flow control valves 6 and the pin rod 8 are driven or actuated in the valve opening direction. Thus, the multiple intake air flow control valves 6 are opened. In other words, the multiple intake air flow control valves 6 and the pin rod 8 are operated such that the valve opening degree of the valve unit (TCV) becomes the fully-opened opening degree, or the multiple intake air flow control valves 6 are positioned at the full open position.

In the above case, intake air flows from the first intake passage 11 of the intake manifold 4 of the engine into the second intake passage 12 formed in the housing 5 via the inlet portion of the housing 5. Then, the intake air passes straight through the second intake passage 12, and is introduced into the intake port 2 mounted on the cylinder head 1 of the engine through the outlet portion of the housing 5. Then, the intake air flow, which passes through the intake port 2, is supplied into the combustion chamber through the intake air valve port of the intake port 2. At the above case, the intake air vortex flow in the axial direction (tumble flow) is not generated in the combustion chamber.

In contrast, when the engine is cooled, and thereby the less amount of suctioned intake air (less intake air amount) is required, in other words, when the engine is started or idled, the ECU controls the supply of the electric power to the electric motor, or the ECU energizes the electric motor, for example. In the above case, by using the driving force of the electric motor, the multiple intake air flow control valves 6 and the pin rod 8 are driven in the valve closing direction. Thus, the multiple intake air flow control valves 6 are closed. In other words, the multiple intake air flow control valves 6 are controlled such that the valve opening degree of the valve unit (TCV) becomes the fully closed opening degree, or the valves 6 are located at the full closed position.

In the above case, most of the intake air, which flows from the first intake passage 11 into the second intake passage 12 via the inlet portion of the housing 5, flows through a clearance (the opening 27) between the valve top end surface of the intake airflow control valve 6 and the housing upper wall portion of the housing 5. Then, the intake air is introduced from the outlet portion of the housing 5 into an upper layer portion of each intake port 2, and then the intake air flows along a top wall surface at the upper layer portion of the intake port 2. Then, the intake air flow, which flows along the top wall surface at the upper layer portion of the intake port 2, is supplied the combustion chamber from the intake air valve port of the intake port 2. In the above case, the tumble flow is generated in the combustion chamber of each cylinder of the engine, and thereby when the engine is started or idled, an efficiency of combustion in the combustion chamber is improved. As a result, fuel economy and emission (for example, HC reduction effect) are improved.

Advantages of First Embodiment

As above, in the intake air vortex flow generator of the present embodiment, the multiple elastic deformation portions 43 are partially and integrally formed at the inner periphery of the first gasket main body 41 of the first gasket 14. As a result, even when the intake air flow control valve 6 is applied with vacuum pressure of intake air of the engine, and thereby causing the housing 5 and the intake air flow control valve 6 to be displaced toward the intake manifold attachment surface side of cylinder head 1, the elastic deformation effect (impact force absorbing function) of the multiple elastic deformation portions 43 achieved by the first gasket 14, which is provided between the intake manifold attachment surface 3 of the cylinder head 1 and the annular end surface 23 of the housing 5, is able to mitigate interference and collision between the intake manifold attachment surface 3 of the cylinder head 1 and the annular end surface 23 of the housing 5.

Accordingly, the abnormal noise caused by the interference and collision between the intake manifold attachment surface 3 of the cylinder head 1 and the annular end surface 23 of the housing 6 of the valve unit (TCV) is limited from being generated.

Also, the multiple elastic deformation portions 43 are integrally formed at the inner periphery of the first gasket main body 41 of the first gasket 14 such that the multiple elastic deformation portions 43 are inserted into the clearance formed between the intake manifold attachment surface 3 of the cylinder head 1 and the annular end surface 23 of the housing 5. Specifically, the multiple elastic deformation portions 43 are provided to project from the inner periphery of the first gasket main body 41, which is provided between the intake manifold attachment surface 3 of the cylinder head 1 and the bonding surface 16 of the intake manifold 4, toward the clearance formed between the intake manifold attachment surface 3 of the cylinder head 1 and the annular end surface 23 of the housing 5. As a result, the number of components and assembly manpower is limited from increasing, and thereby the cost is reduced.

Also, in the valve unit (TCV) of the present embodiment, the multiple elastic deformation portions 43 of the first gasket 14 are set back relative to the intake passage wall surface of the housing 5 in a direction away from the second intake passages 12 such that the multiple elastic deformation portions 43 are limited from projecting into the second intake passages 12. Due to the above, intake air resistance of intake air that flows through the second intake passage 12 is limited from increasing. Thus, intake air amount supplied to the combustion chamber of each cylinder of the engine is limited from decreasing.

In the above, the annular end surface 17 of the intake manifold 4 of the present embodiment is set back relative to the bonding surface 16 of the intake manifold 4 toward the upstream side in the intake air flow direction by a dimension generally equivalent to the thickness of the elastic deformation portion 43 of the first gasket 14. Also, the annular end surface 23 of the housing 5 of the present embodiment is set back relative to the bonding surface 16 of the intake manifold 4 toward the upstream side in the intake air flow direction by a dimension generally equivalent to the thickness of the elastic deformation portion 43 of the first gasket 14. Due to the above configuration, even if the bonding surface 16 of the intake manifold 4 is air-tightly brought into contact with and is bonded with the intake manifold attachment surface 3 of the cylinder head 1 by a bonding process, the multiple elastic deformation portions 43 is limited from being deformed in the space between (a) the intake manifold attachment surface 3 of the cylinder head 1 and (b) the annular end surface 17 of the intake manifold 4, and in the space between (a) the intake manifold attachment surface 3 and (b) the annular end surface 23 of the housing 5. Thus, the impact force absorbing function of the elastic deformation portion 43 of the first gasket 14 is limited from deteriorating.

According to the above embodiment, the bonding surface 16, which is bonded with the attachment surface 3 of the internal combustion engine, is provided downstream of the intake manifold 4 (intake air induction duct) in the intake air flow direction. Also, the receiving chamber 13 of the intake air induction duct 4 opens at the bonding surface 16 of the intake air induction duct 4. As a result) the valve unit having the housing 5 and the valve 6 is inserted into the receiving chamber 13 in a direction toward the bonding surface 16 of the intake air induction duct 4.

According to the above embodiment, the intake air induction duct 4 is provided to surround the periphery of the housing 5. Also, the outer peripheral surface 22 of the housing 5 faces the wall surface 21 of the receiving chamber 13 of the intake air induction duct 4 and is spaced from the wall surface 21 by a predetermined clearance. Thus, the assembly of the valve unit into the receiving chamber 13 of the intake air induction duct 4 is facilitated.

Second Embodiment

Figure 2A:
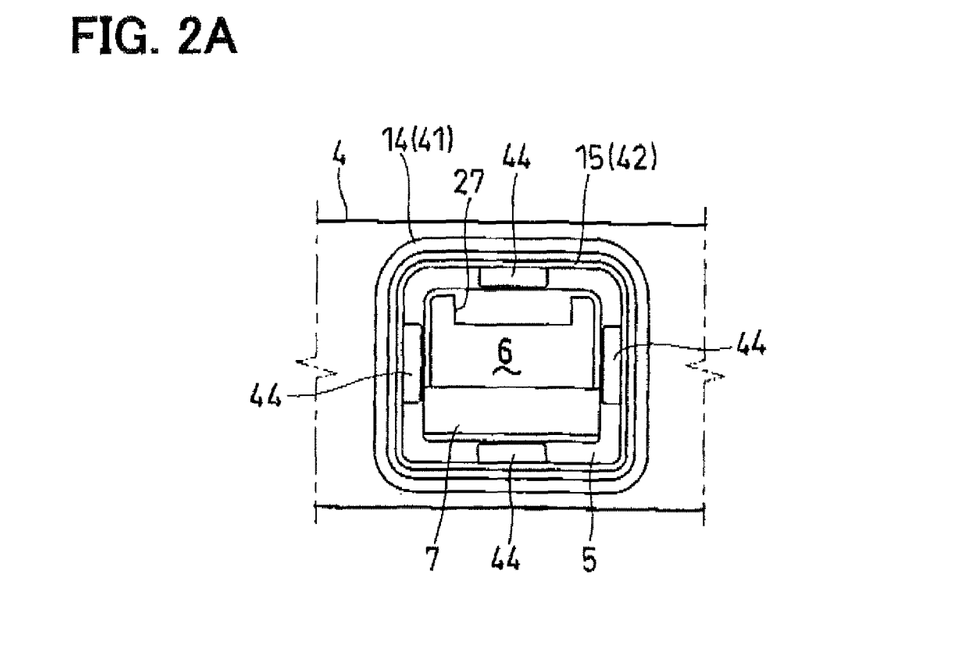
FIG. 2A is a cross-sectional view of an intake control device for an internal combustion engine taken along line IIA-IIA in FIG. 2B according to a second embodiment of the present invention.
Figure 2B:
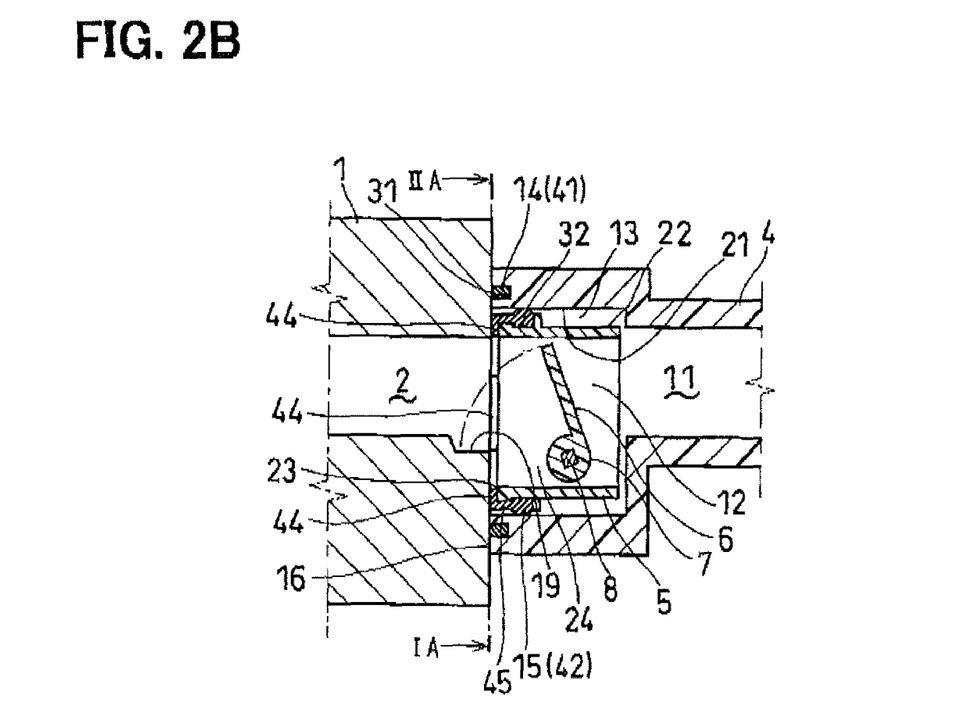
FIG. 2B is a schematic drawing showing the intake control device of the internal combustion engine.

FIGS. 2A and 2B show the second embodiment of the present invention, and specifically, FIG. 2A is a front view showing a valve unit (cartridge), and FIG. 2B is a diagram illustrating an intake control device for the internal combustion engine.

In the present embodiment, the annular end surface 23 of the housing 5 of the valve unit (TCV) faces with the intake manifold attachment surface 3 of the cylinder head 1 and is spaced from the intake manifold attachment surface 3 by a predetermined clearance. Also, in the present embodiment, the bonding surface 16 of the intake manifold 4, which surface 16 is provided closer to the outer periphery side of the first gasket fitting groove 31 is provided on the plane same with the annular end surface of the intake manifold 4, which surface is provided on the inner periphery side of the first gasket fitting groove 31. In other words, the annular end surface of the intake manifold 4 constitutes the bonding surface 16 that is bonded with the intake manifold attachment surface 3 of the cylinder head 1.

Also, the second gasket 15 of the present embodiment includes multiple elastic deformation portions 44 and an extension portion 45. The multiple elastic deformation portions 44 are provided between the intake manifold attachment surface 3 of the cylinder head 1 and the annular end surface 23 of the housing 5. The extension portion 45 extends from a front surface of the second gasket main body 42 or from the downstream side end surface of the second gasket main body 42 in the intake air flow direction toward the downstream side in the intake air flow direction. Also, the extension portion 45 has a square annular shape or a rectangular annular shape. The above elastic deformation portions 44 project from the inner periphery of the extension portion 45 to be inserted into the space between the intake manifold attachment surface 3 of the cylinder head 1 and the annular end surface 23 of the housing 5.

The multiple elastic deformation portions 44 are provided between the intake manifold attachment surface 3 of the cylinder head 1 and the annular end surface 23 of the housing 5, and are impact force absorbing portions that are elastically deformable in the intake air flow direction. Note that, multiple elastic deformation portions 44 are provided at four sides of the extension portion 45 of the second gasket main body 42 respectively. However, the elastic deformation portions 44 may be alternatively provided to at least one pair of opposing sides.

Also, the multiple elastic deformation portions 44 are set back relative to a wall surface (inner peripheral surface) of the intake passage 12 of the housing 5 in a direction away from the second intake passage 12 such that the multiple elastic deformation portions 44 are limited from projecting in the second intake passage 12.

In the above configuration, the annular end surface 23 of the housing 5 of the present embodiment is set back relative to the bonding surface 16 of the intake manifold 4 toward the upstream side in the intake air flow direction by a dimension equivalent to the thickness of the elastic deformation portion 44 of the second gasket 15.

Due to the above configuration, the valve unit or the intake air vortex flow generator of the present embodiment is able to achieve the effect similar to the first embodiment.
(Modification)

In the present embodiment, the present invention is applied to the intake control device for the internal combustion engine having the intake air vortex flow generator. However, the present invention may be applied to an intake air flow control apparatus (the throttle control device) for the internal combustion engine, which apparatus is capable of controlling the amount of intake air suctioned into the combustion chamber of each cylinder of the internal combustion engine. Also, the present invention may be applied to a variable intake control device for the internal combustion engine, which apparatus includes intake air adjustable valve for changing a passage length of the intake passage or the passage cross-sectional area.

In the present embodiment, the intake air vortex flow generator is configured to generate the intake air vortex flow in the axial direction (tumble flow) in order to enhance the combustion of the air-fuel mixture in the combustion chamber of each cylinder of the engine. However, the intake air vortex flow generator may be alternatively configured to generate an intake air vortex flow in a lateral direction (swirl flow) in order to enhance the combustion of the air-fuel mixture in the combustion chamber of each cylinder of the engine. Also, the intake air vortex flow generator may be further alternatively configured to generate a squish vortex in order to enhance the combustion in the engine.

In the present embodiment, the valve drive device (actuator), which drives the rotational shaft 7 of the intake air flow control valve 6, employs an electric actuator having the electric motor. However, an alternative actuator, which drives the rotational shaft of the valve, may be a vacuum operated actuator having an electromagnetic or electric vacuum control valve. Also, the alternative actuator may employ an electromagnetic actuator that includes an electromagnet, such as a coil, and a moving core (an armature).

Also, in the present embodiment, the TCV serves as the intake air control valve, which includes a valve provided in the intake passage formed in the intake air induction duct, and which controls suctioned air (intake air) suctioned into the combustion chamber of the engine. However, instead of the TCV of the present embodiment, an intake air flow control valve, which includes a throttle valve provided in the intake passage defined in the throttle body, may be employed. The intake air flow control valve controls an amount of intake air (intake air amount) suctioned into the combustion chamber of the engine. Also, alternatively, another intake air flow control valve, which includes an idle rotation speed control valve provided in the intake passage defined in the housing, may be employed. The above intake air flow control valve controls an amount of intake air (intake air amount) that bypasses the throttle valve.

Also, instead of the intake air flow control valve, such as TCV, or instead of the intake air flow control valve, an intake passage on-off valve, an intake passage switch valve, or an intake air pressure control valve may be employed as the intake air control valve having the valve. Also, the intake air control valve of the present invention may be applied to the intake air flow control valve (for example, a tumble flow control valve, a swirl flow control valve) and also may applied to an intake air adjustable valve that changes the passage length of the intake passage or the passage cross-sectional area. Also, the engine may be a diesel engine. Also, the engine is not limited to a multiple cylinder engine, but may be a single cylinder engine.

Also, the valve is not limited to the multiple integral valve assembly having multiple valve units, but may be a single cantilever valve unit or a single double-lap valve unit provided that the valve is provided in the intake passage. In the above, the double-flap valve unit includes a rotational shaft and two flaps or two valve elements that extend from the rotational shaft in opposite radial directions of the rotational shaft.

Also, the intake air flow control valve 6 may be provided in the intake pipe other than the intake manifold 4, or may be assembled to the intake port 2 of the cylinder head 1 of the engine.

Also, in the present embodiment, the intake air flow control valve 6 has a square front shape or a rectangular front shape. However, the intake air flow control valve 6 may alternatively have a round front shape, an oval front shape, a rectangular round shape, or a polygonal front shape. In the above alternative case, the cross-sectional shape of the intake passage in the housing (tubular portion) of the intake air induction duct is configured to have the shape that corresponds to the front shape of the intake air flow control valve 6.

Also, the present embodiment employs the multiple integral valve opening and closing device, in which each valve unit has the single intake air flow control valve 6 movably assembled in the single housing 5 for opening and closing the passage. Also, the multiple valve units are assembled in the intake manifold 4 serving as the intake air induction duct such that the multiple valve units are spaced from each other along the rotational axis of the pin rod 8 by predetermined intervals. However, alternatively, another multiple integral valve opening and closing device may be employed, in which multiple valves are directly provided in the intake air induction duct (another engine intake pipe, an engine head covers a cylinder head) along the rotational axis of the shaft by predetermined intervals. In the above case, the housings 5 are omitted.

In the present embodiment, the elastic deformation portion 43 of the first gasket 14 and the elastic deformation portion 44 of the second gasket 15 are configured to project from the first and second gasket main bodies 41, 42 such that the elastic deformation portions 43, 44 are inserted into the clearance defined between the intake manifold attachment surface 3 of the cylinder head 1 (the attachment surface of the internal combustion engine) and the annular end surface 23 of the housing 5. However, the elastic deformation portion 43 of the first gasket 14 and the elastic deformation portion 44 of the second gasket 15 may be alternatively configured to project from the first and second gasket main bodies 41, 42 such that the elastic deformation portions 43, 44 attach to the intake manifold attachment surface 3 of the cylinder head 1 (the attachment surface of the internal combustion engine) or the annular end surface 23 of the housing 5.

Additional advantages and modifications will readily occur to those skilled in the art. The invention in its broader terms is therefore not limited to the specific details, representative apparatus, and illustrative examples shown and described.

What is claimed is:

1. An intake control device for an internal combustion engine comprising:
    an intake air induction duct that is bonded to an attachment surface of the internal combustion engine, the intake air induction duct defining a receiving chamber therein;
    a housing that is received in the receiving chamber of the intake air induction duct, the housing defining an intake passage therein;
    a valve that is received in the housing for opening and closing the intake passage;
        a first gasket that is mounted between the intake air induction duct and the attachment surface of the internal combustion engine; and
        a second gasket that is mounted between the housing and a wall surface of the receiving chamber of the intake air induction duct, wherein:
    a distalmost end face of the housing opposes the attachment surface of the internal combustion engine and is spaced from the attachment surface by a predetermined clearance; and
    the first gasket has a plurality of elastic deformation portions that are positioned between the distalmost end face of the housing and the attachment surface of the internal combustion engine.

2. The intake control device for the internal combustion engine according to claim 1, wherein:
    the intake air induction duct has a bonding surface on a downstream side of the intake air induction duct in a direction of an intake air flow, the bonding surface being bonded with the attachment surface of the internal combustion engine; and
    the receiving chamber opens at the bonding surface of the intake air induction duct.

3. The intake control device for the internal combustion engine according to claim 1, wherein:
    the intake air induction duct is provided to surround the housing; and
    the housing has an outer peripheral surface, which faces with the wall surface of the receiving chamber of the intake air induction duct, and which is spaced from the wall surface of the receiving chamber by a predetermined clearance.

4. The intake control device for the internal combustion engine according to claim 1, wherein:
    the housing has an annular end surface on a downstream side of the housing in a direction of an intake air flow;
    the annular end surface faces with the attachment surface of the internal combustion engine; and
    the annular end surface is spaced from the attachment surface of the internal combustion engine by a predetermined clearance.

5. The intake control device for the internal combustion engine according to claim 1, wherein:
    the elastic deformation portions are set back relative to a wall surface of the intake passage of the housing in a direction away from the intake passage such that the elastic deformation portions are limited from projecting inside the intake passage.

6. The intake control device for the internal combustion engine according to claim 1, wherein:
    the first gasket has an annular gasket main body that is provided between the attachment surface of the internal combustion engine and the intake air induction duct; and
    the elastic deformation portions project from the gasket main body to be positioned between the housing and the attachment surface of the internal combustion engine.

7. The intake control device for the internal combustion engine according to claim 1, wherein:
    the intake air induction duct has a bonding surface on a downstream side of the intake air induction duct in a direction of an intake air flow, the bonding surface being bonded with the attachment surface of the internal combustion engine;
    the housing has an annular end surface on a downstream side of the housing in the intake air flow direction, the annular end surface facing with the attachment surface of the internal combustion engine, the annular end surface being spaced from the attachment surface by a predetermined clearance; and
    the annular end surface of the housing is set back relative to the bonding surface of the intake air induction duct toward the upstream side in the intake air flow direction by a dimension generally equivalent to a thickness of the elastic deformation portions.

8. The intake control device for the internal combustion engine according to claim 1, wherein:
    the valve has a rotational shaft that is rotatably received in the housing.

9. The intake control device for the internal combustion engine according to claim 8, wherein:
    the valve has two slide portions at both ends of the valve along a rotational axis of the valve, the two slide portions being slidably supported by the housing.

10. The intake control device for the internal combustion engine according to claim 1, wherein:
    the first gasket is separated from the second gasket.

11. The intake control device for the internal combustion engine according to claim 10, wherein:
    the elastic deformation portions of the first gasket are axially spaced from the second gasket.

* * * * *